Figure 1:
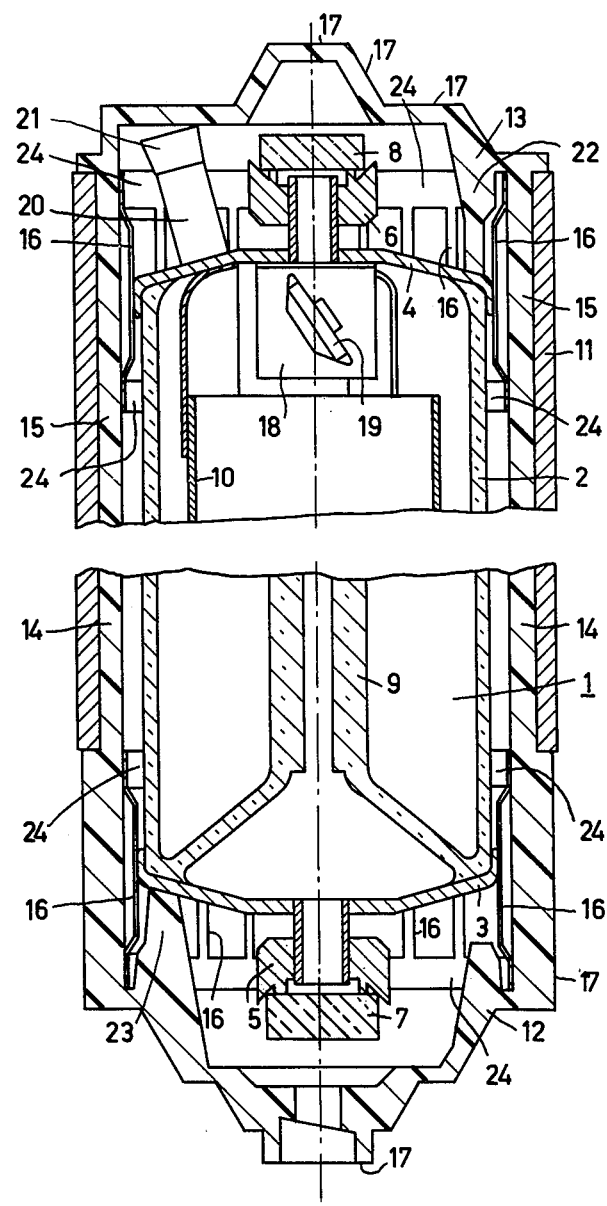

United States Patent [19]
van den Brink et al.

[11] 4,328,467
[45] May 4, 1982

[54] GAS DISCHARGE LASER DEVICE

[75] Inventors: Hans G. van den Brink; Theodorus F. Lamboo, both of Eindhoven, Netherlands

[73] Assignee: U.S. Philips Corporation, New York, N.Y.

[21] Appl. No.: 111,621

[22] Filed: Jan. 14, 1980

[30] Foreign Application Priority Data

Oct. 15, 1979 [NL] Netherlands ........................ 7907597

[51] Int. Cl.³ .............................................. H01S 3/05
[52] U.S. Cl. ........................................ 372/98; 372/61
[58] Field of Search ..................... 331/94.5 D, 94.5 C, 331/94.5 G

[56] References Cited
U.S. PATENT DOCUMENTS 4,081,762 3/1978 Golser et al. ................. 331/94.5 D Primary Examiner—William L. Sikes
Assistant Examiner—Léon Scott, Jr.
Attorney, Agent, or Firm—Thomas A. Briody; Robert T. Mayer; Bernard Franzblau

[57] ABSTRACT

A shock-proof gas discharge laser device comprises a cylindrical discharge vessel secured coaxially in a metal tubular holder. The cylindrical discharge vessel is sealed at its two ends with sealed metal end plates provided with supports for multilayer reflectors. The metal end plates are centered in beaker-shaped insulator caps which surround the end plates. The cylinder surface of the caps extend at least partly within the metal tubular holder in contact therewith. The electrical connections of the gas discharge laser are provided in said caps.

12 Claims, 5 Drawing Figures

GAS DISCHARGE LASER DEVICE

The invention relates to a gas discharge laser device comprising a coaxial gas discharge laser which is secured coaxially in a metal tubular holder.

Such a gas discharge laser device is disclosed in U.S. Pat. No. 3,847,703. The device described in said patent produces a concentric laser beam which is parallel to the tubular holder by securing the gas discharge laser, after it has been positioned in the metal tubular holder, by means of elastic spacer pads in the tube. Such gas discharge laser devices have a wide field of application, for example, for alignment in the construction field, in distance measuring devices, copying machines, measuring devices, for measuring air and water pollution, and in apparatus for displaying optical information carriers, for example, the video disc player for displaying video discs via a television set. It must therefore be possible to produce such devices in large numbers in a cheap and rapid manner but nevertheless with a great accuracy. U.S. Pat. No. 4,238,743 discloses a cheap coaxial gas discharge laser which comprises a cylindrical discharge vessel the ends of which are sealed by means of metal end plates, which end plates are provided in the center with supports of multilayer reflectors. When the end plates are also used as electric connections for the gas discharge laser, assembling such a gas discharge laser in a metal tubular holder in the manner as described in U.S. Pat. No. 3,847,703 presents insurmountable insulation problems. Moreover, the centering of the laser in the tubular holder by means of elastic spacer pads has not proved to be optimum.

It is therefore an object of the invention to provide a gas discharge laser device in which a good electrical insulation is ensured and the centering of the gas discharge laser in the tubular holder is maintained during operation of the laser due to a large resistance to shocks.

According to the invention, a gas discharge laser device of the kind mentioned in the opening paragraph is characterized in that the gas discharge laser comprises a cylindrical discharge vessel which is sealed at each of its two ends by means of sealed metal end plates which are provided with supports with multilayer reflectors. The metal end plates are centered in beaker-shaped caps which surround the end plates, said beaker-shaped caps being made of an insulation material and the cylinder surface of the caps extending partly within the metal tubular holder so as to engage a part of the holder. The electric connections of the gas discharge laser also take place in said caps.

Since the caps are provided in the tubular holder in a fitting manner and the end plates of the laser to which the reflector members are secured are centered in the caps, the optical axis of the laser is accurately fixed and is shock proof wih respect to the tubular holder. Since the cylinder surfaces of the caps extend at least partly within the metal tubular holder, a good electrical insulation of the end plates is obtained with respect to the metal tubular holder.

The centering of the end plates in the caps can be obtained in a number of ways. For example, it is possible that a number or centering springs project from the inner wall of the beaker-shaped cap regularly around the axis of the laser. The centering of the end plates in the caps is preferably obtained in that the caps are provided with springs which consist of metal rods or strips and yield in the radial and tangential directions and extend regularly around the axis of the laser parallel or substantially parallel to the axis of the laser. If one of the end plates is the anode of the laser and the electric connection to said anode is made by means of springs, the cylinder surface of the cap preferably only partly extends fittingly in the metal tubular holder so that the anode and the springs are situated outside the tubular holder in the cap. Actually this serves to provide a small stray capacitance between the anode and the cathode (ground). A small stray capacitance is desired because the discharge of the laser has a negative resistance characteristic. In order to maintain a stable discharge in the laser, a ballast resistor must therefore be incorporated in the electric supply of the laser, the resistance of which is larger than the negative resistance of the discharge. If the current through the discharge of the laser decreases, the negative resistance increases until the so-called "drop-out current" is reached at which the ballast resistance is no longer large enough. With this so-called drop-out current, instabilities will start occurring in the discharge and the discharge will usually extinguish. It has been found that the drop-out current can be made smaller by increasing the ballast resistance and reducing the stray capacitance between the anode and the cathode. In fact this capacitance forms part of the ballast impedance. This reduction of the capacitance can be obtained by positioning the end plate which forms the anode and the springs outside the tubular support.

It has been found that the centering of the laser is maintained optimally during operation of the device and the device thus has a large shock resistance if the rigidity (stiffness of the metal rods or strips in the radial direction (along a line perpendicular to the laser axis) is larger than in the tangential direction (tangent to a circle around the laser axis in a plane perpendicular to the laser axis).

A preferred embodiment of a gas discharge laser device in accordance with the invention is characterized in that the ends of all rods or strips are connected to metal ribbons situated substantially coaxially around the said axis against the wall of the cap and the rods or strips situated between the metal ribbons are raised from the wall.

When the metal strips and the metal ribbons are manufactured from one piece of metal sheet material and the strips between the metal ribbons near the metal ribbons are twisted 90° so that the rigidity in the radial direction is larger than the rigidity in the tangential direction, an optimum shock resistance of the laser in the holder is obtained.

The beaker-shaped caps of insulation material are preferably provided with at least one reference face for positioning the laser device with respect to its environment and the axial position of the laser in the cap is fixed by means of at least one shoulder which is present in the cap and against which the metal end plate of the laser bears.

Figure 2:
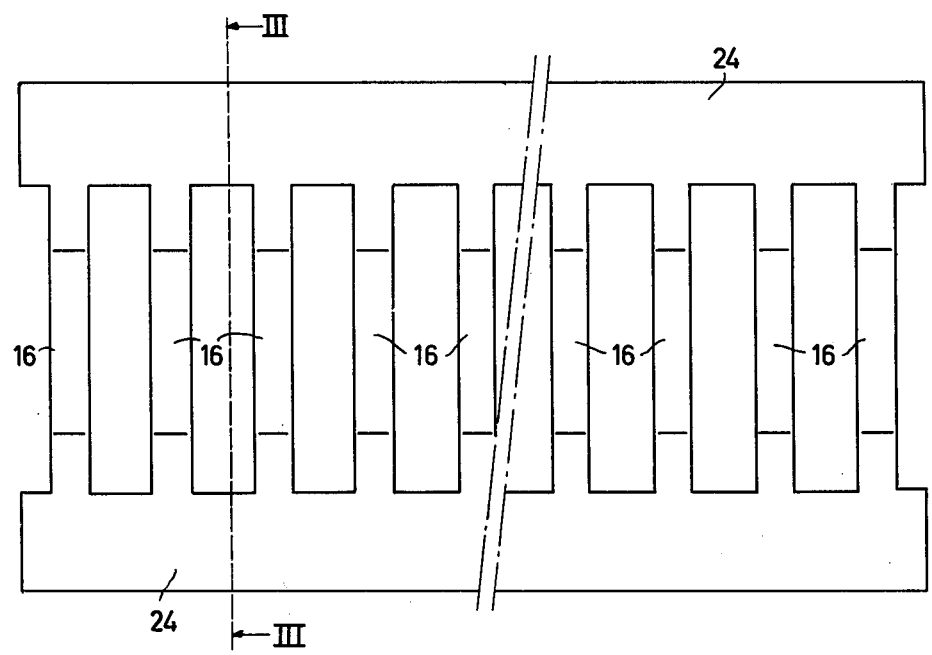
Figure 3:
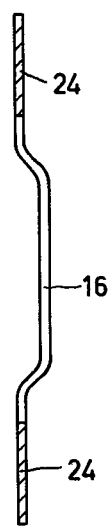
Figure 4:
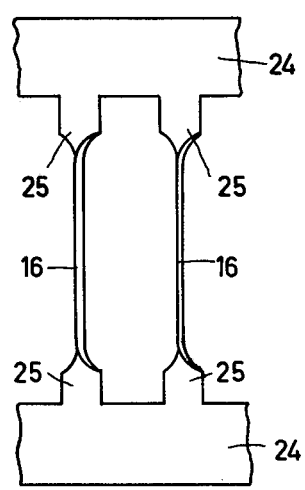
Figure 5:
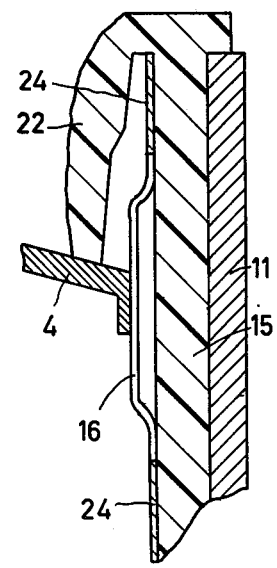

The invention will now be described in greater detail, by way of example, with reference to the accompanying drawing, in which:

FIG. 1 is a longitudinal sectional view of a gas discharge laser device according to the invention, FIG. 2 is a developed view of the springs used, FIG. 3 is a sectional view of FIG. 2, FIG. 4 is an elevation of another embodiment of the springs, and FIG. 5 shows a detail of FIG. 1.

FIG. 1 is a longitudinal sectional view of a gas discharge laser device according to the invention. It comprises a gas discharge laser 1 which is composed of a glass tubular envelope 2 which is sealed at its two ends by means of metal end plates 3 and 4. In the centers of said end plates are supports 5 and 6 for the multilayer reflectors 7 and 8, which together with the laser capillary 9 form the laser resonator. The required electrical energy is supplied to the laser via a cylindrical cathode 10 which is connected electrically to end plate 4 and an anode which is formed by the end plate 3. In the envelope a gas mixture is present, for example a He-Ne mixture. By applying a suitable voltage, a laser beam is generated as a result of stimulated emission in the laser resonator, which beam leaves the laser via the reflector 7. When such a laser device is used, for example, in a video disc player, the location and direction of the laser beam must be very constant. For that purpose, the gas discharge laser is mounted in a metal tubular holder 11 by means of two beaker-shaped caps 12 and 13 the cylinder surfaces 14 and 15 of which extend into the holder 11 in contact with the inner wall thereof. Since the end plates 3 and 4 are accurately centered in the caps by means of a number of springs 16 consisting of a number of metal strips which are provided in the caps 12 and 13 and because the caps are provided fittingly in the holder 11, the position and direction of the optical axis of the laser coincides with the axis of the holder 11. End plate 3 constitutes the anode of the gas discharge laser. In order to make the stray capacitance of the anode small with respect to the cathode (and ground), the cylinder surface 14 is placed in the metal tubular holder 11 only over such a distance that the anode (end plate 3) and the springs 16 in the cap 12 are situated outside the tubular holder 11.

The location and direction of a laser beam generated by means of such a gas discharge laser device have proved to be very constant. For positioning the device relative to its environment, it may be provided with reference faces 17. In order to obtain a polarized laser beam, a Brewster window 19 is provided in a holder 18. An exhaust tube 20, which after filling the gas discharge laser has been sealed by means of pinch 21, is provided in end plate 4. The movement of the laser in the axial direction is restricted by shoulders 22 and 23. The ends of the springs 16 are connected to metal ribbons 24 engaging the inner wall of the caps. The springs 16 are raised from the inner surface of the beaker-shaped caps. The shape and the operation of the centering springs will be described further with reference to the description of the following Figures.

FIG. 2 shows a number of metal strip-shaped springs 16 which form one assembly with the metal ribbons 24. The ribbons 24 are situated in the cap against the inner wall of the cap, while the springs 16 situated between the metal ribbons 24, as is shown in FIG. 3, are bent out of the plane in which the metal ribbons are situated so that they are raised from the inner wall of the cap. The sheet material from which the ribbons and springs are manufactured is, for example, CrNi steel of 0.3 mm thick. The width of the springs 16 is, for example, 1.5 mm and the springs have a mutual distance of 2.5 mm. The length of the springs is, for example, 12 mm.

FIG. 4 is an elevation of another embodiment of two springs the rigidity of which in the radial direction is larger than the rigidity in the tangential direction. For that purpose, the metal strips 16 are provided with twisted portions 25 near the metal ribbons 24 so that the plane of the springs 16 is perpendicular to the plane determined by the ribbons 24.

FIG. 5 shows a detail of FIG. 1. In this case non-twisted springs are used. For components already shown in preceding Figures, the same reference numerals are used as in those Figures for reasons of clarity.

What is claimed is:

1. A gas discharge laser device comprising a cylindrical discharge vessel containing a gas including an active lasing medium and mounted coaxially in a metal tubular holder, the cylindrical discharge vessel being sealed at each of its two ends by means of respective sealed metal end plates provided with respective centrally located supports for respective multilayer reflectors, means for centering each of said metal end plates in respective insulator caps which surround the respective end plates, said insulator caps having a first cylindrical surface extending within the metal tubular holder so as to engage at least a part of the tubular holder, and wherein electric connections to a cathode and anode of the gas discharge laser are provided within said caps.

2. A gas discharge laser device as claimed in claim 1 wherein the centering means comprise a plurality of springs which comprise metal strips that are flexible in the radial and tangential directions, said strips being uniformly disposed around the axis of the laser and extending substantially parallel thereto.

3. A gas discharge laser device as claimed in claim 2 wherein one of the end plates is the anode of the laser and the electric connection to the anode is made via the springs, the anode and the springs being situated outside the tubular holder in a further cylindrical portion of the cap that extends axially away from the first cylindrical surface of the cap.

4. A gas discharge laser device as claimed in claims 2 or 3, wherein the stiffness of the metal strips is larger in the radial direction than in the tangential direction.

5. A gas discharge laser device as claimed in claims 2 or 3 wherein the two ends of each of the strips are respectively connected to two circumferential metal ribbons extending substantially coaxially around said axis against the inner wall of the cap and with at least a part of said strips that extend between the two circumferential metal ribbons being spaced from the cap wall.

6. A gas discharge laser device as claimed in claim 5 wherein the metal strips and the two circumferential metal ribbons are made from one integral piece of sheet metal and that parts of the strips between the metal ribbons and near the metal ribbons are twisted 90° so that the stiffness is greater in the radial direction than in the tangential direction.

7. A gas discharge laser device as claimed in claims 1, 2 or 3 wherein the insulator caps are cylindrical and are provided with at least one reference face for positioning the laser device relative to its environment.

8. A gas discharge laser device as claimed in claims 1, 2 or 3 wherein the insulator cap includes an internal shoulder for fixing the axial position of the discharge vessel in the cap and against which the metal end plate of the discharge vessel bears.

9. A gas discharge laser device as claimed in claim 1 wherein the centering means comprise a plurality of elongate resilient metal strips within the insulator caps and which extend parallel to the laser axis and are disposed uniformly about the circumference of the discharge vessel.

10. A gas discharge laser device as claimed in claim 9 wherein the discharge vessel is made of glass and the metal centering strips are arranged to provide a greater stiffness in the radial direction than in the axial direction.

11. A gas discharge laser device as claimed in claims 9 or 10 wherein at least one of said metal end plates includes a cylindrical collar extending around one end of the cylindrical discharge vessel and the respective metal centering strips engage the outer surface of said cylindrical collar.

12. A gas discharge laser device as claimed in claims 9 or 10 wherein one of said metal end plates comprises said anode of the gas discharge laser, said anode end plate making electric contact with its respective metal centering strips and said end plate and centering strips being located within the respective insulator cap so that they are axially spaced from the respective end of the metal tubular holder thereby to reduce any stray capacitance therebetween.

* * * * *